US007103548B2

(12) United States Patent
Squibbs et al.

(10) Patent No.: US 7,103,548 B2
(45) Date of Patent: Sep. 5, 2006

(54) AUDIO-FORM PRESENTATION OF TEXT MESSAGES

(75) Inventors: Robert Francis Squibbs, Bristol (GB); Paul St. John Brittan, Claverham (GB); Guillaume Belrose, South Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 972 days.

(21) Appl. No.: 10/162,038

(22) Filed: Jun. 3, 2002

(65) Prior Publication Data

US 2002/0193996 A1 Dec. 19, 2002

(30) Foreign Application Priority Data

Jun. 4, 2001 (GB) ................. 0113570.6

(51) Int. Cl.
*G10L 21/00* (2006.01)
(52) U.S. Cl. .................................. 704/260
(58) Field of Classification Search ............... None
See application file for complete search history.

(56) References Cited

U.S. PATENT DOCUMENTS

| | | | |
|---|---|---|---|
| 5,475,738 A | 12/1995 | Penzias | 379/67 |
| 5,739,759 A | 4/1998 | Nakazawa et al. | 340/825.44 |
| 5,842,167 A | 11/1998 | Miyatake et al. | 704/260 |
| 5,860,064 A | 1/1999 | Henton | 704/260 |
| 5,875,427 A | 2/1999 | Yamazaki | 704/258 |
| 5,899,975 A | 5/1999 | Nielsen | 704/260 |
| 5,950,123 A | 9/1999 | Schwelb et al. | 455/414 |
| 5,966,691 A * | 10/1999 | Kibre et al. | 704/260 |
| 6,075,998 A | 6/2000 | Morishima | 455/567 |
| 6,385,581 B1 | 5/2002 | Stephenson | 704/270 |
| 6,522,333 B1 * | 2/2003 | Hatlelid et al. | 345/474 |
| 6,865,533 B1 * | 3/2005 | Addison et al. | 704/260 |
| 6,963,839 B1 * | 11/2005 | Ostermann et al. | 704/260 |
| 2001/0054074 A1 | 12/2001 | Hayashi | 709/206 |

FOREIGN PATENT DOCUMENTS

| | | |
|---|---|---|
| EP | 1 111 883 | 6/2001 |
| JP | 4213943 | 8/1992 |
| JP | 11-38996 | 12/1999 |
| JP | 2000122941 | 4/2000 |
| JP | 200014875 | 5/2000 |
| JP | 2001-51688 | 2/2001 |
| JP | 2001034280 | 2/2001 |
| WO | 97/37688 | 8/1998 |
| WO | 99/05613 | 2/1999 |
| WO | 00/21057 | 4/2000 |

OTHER PUBLICATIONS

Abstract of JP2001236205, Sep. 31, 2001, Patent Abstracts of Japan, 1 page.
Abstract of JP2001034280, Feb. 9, 2001, Derwent, 2 pages.

(Continued)

*Primary Examiner*—Susan McFadden (57) ABSTRACT

A text message generated at a sending device is converted into audio form by a message-conversion system for delivery to a target recipient. This conversion is effected in a manner enabling emotions, encoded by indicators embedded in the text message, to be expressed through multiple types of presentation feature in the audio form of the message. The mapping of emotions to feature values is pre-established for each feature type whilst the sender selection of one or more feature types to be used to express encoded emotions is specified by type indications inserted into the message at its time of generation.

24 Claims, 7 Drawing Sheets

OTHER PUBLICATIONS

Abstract of JP2001051688, Feb. 23, 2001, Derwent, 1 page.
Abstract of JP2000122941, Apr. 28, 2000, Derwent, 1 page.
Abstract of JP2000148175, May 26, 2000, Derwent, 1 page.
Abstract of JP4213943, Aug. 5, 1992, Derwent, 1 page.
"Voice eXtensible Markup Language", *VoiceXML Forum*, Version 1.00, pp. 1-101 (Mar. 7, 2000).

* cited by examiner

Figure 1

| EFFECT TAG 'wa' – "wave" | |
|---|---|
| Number | Item Identity |
| 0 | Laughter |
| 1 | Sobbing |
| 2 | Door slamming |
| 3 | Gunshot |
| 4 | Dog growling |
| 5 | Gong |
| 6 | 'Miaow' |
| 7 | Money sound |
| 8 | Knocking |
| 9 | Electric Drill |

| BACKGROUND TAG 'tm' – "theme" | |
|---|---|
| Number | Item Identity |
| 0 | Bach Cantatas |
| 1 | Beethoven Pastoral |
| 2 | Beethoven Eroica |
| 3 | U2 'Beautiful Day' |
| 4 | Goldman 'Peur de Rien' |
| 5 | Office sounds |
| 6 | Traffic sounds |
| 7 | Bar sounds |
| 8 | Waves |
| 9 | Birdsong |

| SUBSTITUTION TAG 'ps' – "personalised substitution" | | |
|---|---|---|
| Number | Short-form text | Item Identity |
| 0 | "hbtu" | Happy birthday refrain |
| 1 | "cul8r" | 'See you later' |
| 2 | | |
| 3 | | |
| 4 | | |
| 5 | | |
| 6 | | |
| 7 | | |
| 8 | | |
| 9 | | |

| VOICING TAG 'dt' – "define talk" | |
|---|---|
| First Number | Voice Type |
| 0 | *Current* |
| 1 | Adult Male, standard |
| 2 | Adult Male, posh |
| 3 | Adult male, regional |
| 4 | Adult female, posh |
| 5 | Child male, normal |
| 6 | |
| 7 | |
| 8 | |
| 9 | |
| Second Number | Voice Mood |
| 0 | *Current* |
| 1 | Happy |
| 2 | Sad |
| 3 | Angry |
| 4 | Resigned |
| 5 | |
| 6 | |
| 7 | |
| 8 | |
| 9 | |

VOICING TAG 40
'dt' – "define talk" 58

| First Number | Voice Type | Emotion |
|---|---|---|
| 0 | *Current* | |
| 1 | Adult Male, standard | 😊 |
| 2 | Adult Male, posh | |
| 3 | Adult male, regional | 😐 |
| 4 | Adult female, posh | |
| 5 | Child male, normal | 😢 |
| 6 | | |
| 7 | | |
| 8 | | |
| 9 | | |

41 →

| Second Number | Voice Mood | *[Fixed]* |
|---|---|---|
| 0 | *Current* | |
| 1 | Happy | 😊 |
| 2 | Sad | 😢 |
| 3 | Cross | 😠 |
| 4 | Shocked | 😲 |
| 5 | | |
| 6 | | |
| 7 | | |
| 8 | | |
| 9 | | |

42 →

BACKGROUND TAG 43
'tm' – "theme" 58

| Number | Item Identity | Emotion |
|---|---|---|
| 0 | Bach Cantatas | |
| 1 | Beethoven Pastoral | |
| 2 | Beethoven Eroica(sm) | 😊 |
| 3 | U2 'Beautiful Day' | 😊 |
| 4 | Goldman 'Peur de Ri' | |
| 5 | Office sounds | |
| 6 | Traffic sounds | |
| 7 | Bar sounds | |
| 8 | Waves | |
| 9 | Birdsong | |

EFFECT TAG 44
'wa' – "wave" 58

| Number | Item Identity | Emotion |
|---|---|---|
| 0 | Laughter | 😊 |
| 1 | Sobbing | 😢 |
| 2 | Door slamming | |
| 3 | Gunshot | |
| 4 | Dog growling | 😠 |
| 5 | Gong | |
| 6 | 'Miaow' | |
| 7 | Money sound | |
| 8 | Knocking | |
| 9 | Electric Drill | |

SUBSTITUTION TAG 45
'ps' – "personalised substitution" 58

| Number | Short-form text | Item Identity | Emotion |
|---|---|---|---|
| 0 | "hbtu" | Happy birthday refrain | |
| 1 | "cul8r" | 'See you later' | |
| 2 | | 'Yippee' | 😊 |
| 3 | | 'Aaargh' | 😢 |
| 4 | | | |
| 5 | | | |
| 6 | | | |
| 7 | | | |
| 8 | | | |
| 9 | | | |

AUDIO-FORM PRESENTATION OF TEXT MESSAGES

FIELD OF THE INVENTION

The present invention relates to audio-form presentation of text messages such as, for example, messages sent using the short message service of a mobile telephone.

BACKGROUND OF THE INVENTION

Mobile telephony systems such as GSM systems generally provide a short message service (SMS) by which a mobile user can send and receive short alphanumeric ("text") messages of several tens of characters. Thus, for example, the GSM standard provides a "Mobile Terminating Short Message Service, Point to Point" (SMS-MT/PP) for the reception of short messages and a "Mobile Originating Short Message Service, Point to Point" (SMS-MO/PP) enabling a mobile user to send a short message to another party, such as another mobile user. Mobile-originating short messages are generally created using a keypad of the mobile device concerned whilst mobile terminating short messages will generally be presented to the recipient via a display of the receiving mobile device.

As regards the architecture of the mobile network needed to support short message services, due to the simplicity and brevity of the short messages concerned, the messages do not require the use of a traffic channel of the mobile network for their transfer, and are, instead, carried by control or management channels. Typically, the network will have an associated short message service centre (SM-SC) which interfaces with the network through specific mobile switching centres acting as SMS gateways. Thus, a mobile-originating messages is passed from a mobile device via a mobile switching centre to the SM-SC, whilst mobile-terminating short messages are passed from the SM-SC via a mobile switching centre to the target mobile device. The SM-SC itself can be provided with a wide range of service functionalities for storing and handling short messages; thus, for example, the SM-SC will generally store incoming mobile-terminating messages until the target mobile device is live to the network and able to receive messages, whilst for mobile-originating messages which are not intended or another mobile device, the SM-SC may provide for conversion of the messages into e-mail for sending on via an e-mail system.

Because of the fact that short messages do not use a traffic channel and generally take up little overhead, the operator charges for using SMS are relatively low. This has made SMS a popular service, particularly with younger persons. However, one problem experienced by the mobile user when using SMS is that the process of generating a short message is generally very tedious because of the restricted nature of the user input interface (a small keypad) provided on most mobile phones. Thus, since the number of keypad keys is less than the number of alphanumeric characters available, double, triple or even higher multiple keying is normally required for each character.

Because voice output is a very convenient way for a recipient to receive messages, particularly when the recipient is already visually occupied (such as when driving a vehicle) or where the recipient is visually impaired, systems are available for converting text messages into speech output. U.S. Pat. No. 5,475,738 describes one such system for converting e-mails to voice messages and U.S. Pat. No. 5,950,123 describes a system specifically adapted for converting SMS messages to speech output.

Of course, interpretation issues arise when effecting conversion of text to speech and, in particular, problems can arise with acronyms and other character combinations which have meanings to a restricted group. SMS messages in particular abound with all sorts of short-form character combinations (such as "cul8r" for "see you later") that are difficult for a text-to-speech converter to handle because such character combinations are non-standard and quick to emerge (and disappear). Another example are so-called "smilies" which are character combinations that supposedly form a graphical depiction of an emotion (thus, the character combination: :->represents a smiling face, often used to imply humour); how a smilie should be handled by a text-to-speech converter is far from clear.

Apart from the conversion of message text to speech, little else is done to enhance the audio presentation of text messages though in this context it may be noted that the use of melodies to announce message arrival is well known, the melodies being either downloaded to the receiving device or locally composed (see, for example, U.S. Pat. Nos. 5,739, 759 and 6075,998). It is also well known to use an audio mark-up language to mark-up information pages, such as web pages, in order to specify certain characteristics of audio presentation of such pages. In the same context, the use of audio style sheets has also been proposed (see U.S. Pat. No. 5,899,975).

It is an object of the present invention to provide improved ways of presenting text messages in audio form.

SUMMARY OF THE INVENTION

According to one aspect of the present invention, there is provided a communications method comprising the steps of:
  (a) providing association data indicating for each of multiple types of presentation feature by which emotions can be expressed in audio form, a respective value of the feature concerned that is to be used to express each of plural emotions;
  (b) generating a text message at a sending device, the generated text message having user-set embedded emotion indicators and feature-type indications,
  (c) converting the text message into audio form for delivery to a target recipient, emotions indicated by the embedded emotion indicators being expressed in said audio form using presentation feature types indicated by the embedded feature-type indicators with the values used for these presentation features being determined by said association data.

According to another aspect of the present invention, there is provided a communications method in which a text message generated at a sending device is converted into audio form by a message-conversion system for delivery to a target recipient, this conversion being effected in a manner enabling emotions, encoded by indicators embedded in the text message, to be expressed through multiple types of presentation feature in the audio form of the message, the mapping of emotions to feature values being pre-established for each feature type whilst the sender selection of one or more feature types to be used to express encoded emotions being specified under user control by type indications in the message.

According to a further aspect of the present invention, there is provided a system for converting a text message into audio form, the text message having embedded emotion indicators and feature-type indications the latter of which serve to determine which of multiple audio-form presentation feature types are to be used to express, in the audio form of the text message, the emotions indicated by said emotion indicators; the system comprising:

a data store holding association data indicating for each of multiple types of presentation feature by which emotions can be expressed in audio form, a respective value of the feature concerned that is to be used to express each of plural emotions;

an interpretation arrangement responsive to the succession of emotion indicators and feature-type indications embedded in the text message to determine for each emotion indicator what type of presentation feature is to be used to express the indicated emotion and, by reference to said association data, what value of that presentation feature is to be used;

an audio-output generation subsystem comprising a text-to-speech converter, and a presentation-feature generation arrangement operative, under the control of the interpretation arrangement, to provide audio-form presentation features in accordance with the succession of emotion indicators and feature-type indications embedded in the text message.

According to a still further aspect of the present invention, there is provided a device for generating a text message, the device including user-controlled input interface enabling the user to embed in the text message both emotion indicators indicative of emotions to be expressed, and feature-type indications which serve to determine which of multiple audio-form presentation feature types are to be used to express, in an audio form of the text message, the emotions indicated by said emotion indicators.

BRIEF DESCRIPTION OF THE DRAWINGS

Embodiments of the invention will now be described, by way of non-limiting example, with reference to the accompanying diagrammatic drawings, in which.

BEST MODE OF CARRYING OUT THE INVENTION

Figure 1:
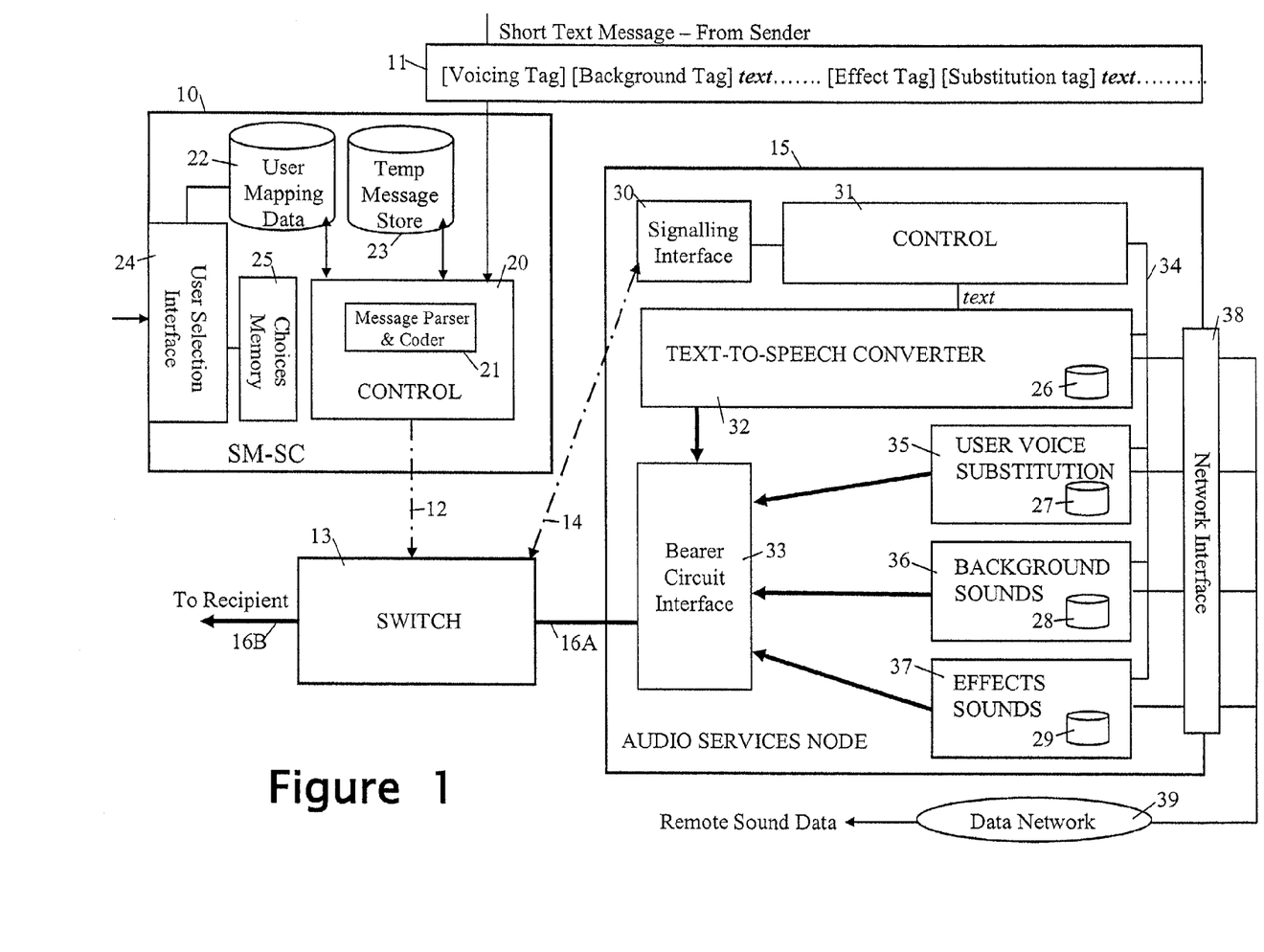
FIG. 1 is a block diagram of a short-message service center and audio service node used in a first embodiment that handles presentation-feature tags embedded in text messages.

FIG. 1 shows elements of a telecommunications infrastructure for converting text-form messages into audio form for delivery to a target recipient over a voice circuit of the infrastructure. More particularly, a short-message service center (SM-SC) 10 is arranged to receive short text messages 11, for example, received from a mobile phone (not shown) via SMS functionality of a Public Land Mobile Network, or intended for delivery to a mobile phone and originating from any suitable device having connectivity to the SM-SC. The SM-SC 10 is arranged to forward text messages (see arrow 12) over a signaling network-typically, an SS7 signaling network-to a voice circuit switch 13 closest to the target recipient, the switch then being responsible for passing the text message via the signaling network (see arrow 14) to an associated audio services node 15. The node has voice circuit connectivity to the switch 16A and is operative to convert the text message into audio form for output over voice circuit 16A to the switch which routes the audio-form message over voice circuit 16B to the target recipient device (typically a mobile phone). In an alternative arrangement, the SM-SC 10 sends the textform message directly to the audio services node 15 which is then responsible not only for converting the message into audio form, but also for causing the switch 13 to set up the required voice circuit from the audio service node to the target recipient. Furthermore, delivery of the audio-form message to the recipient can be effected as packetised audio data over a packet-switched data network (for example, as VOIP) rather than by the use of a voice circuit (which would typically be a telephone voice circuit).

The SM-SC 10 knows to treat the text-form message 11 as one to be converted into audio form for delivery (rather than being handled as a standard text message) by virtue of a suitable indicator included in a message header field (not shown). Alternatively, the SM-SC 10 can be set up to treat all messages 11 that are addressed to devices without a text-messaging capability (in particular, standard fixed-line telephones) as ones to be converted into audio form. Yet another possibility would be for the sender to pre-specify (via interface 24 described below) for which recipients conversion to audio should be effected. Indeed, the intended recipient could specify in advance, in user-profile data held by their local network, whether they wish incoming text messages to be converted to audio; in this case, the recipient profile data would need to be queried by the SM-SC 10, or another network node, to determine how the message 11 was to be handled.

As will be more fully described below, in addition to the conversion of normal text included in message into speech using a text-to-speech converter (TTS) 32, the audio services node 15 is also arranged to customize its voicing of the message and to incorporate particular sound passages into the audio form of the message, in accordance with tags included in the text form of the message. In fact, in the present embodiment, it is SM-SC 10 that identifies tags included in the text-form message and converts the tags into codes that are included in the message as passed to the service node, these codes indicating to the node 15 the details of the voicing parameters and sound passages to be used to enhance the audio form of the message.

The tags are included into the text-form of the message 11 by the sender of the message. The following tag types are used in the present example to personalize the presentation of the audio form of the message, each tag type corresponding to a particular presentation feature type:

voicing tags for setting parameters of the TTS converter 32 (or, indeed, for selecting a particular TTS converter from a farm of available converters each, for example, dedicated to a particular voice style);

background tags for adding in background sound passages (typically, background music);

sound effect tags for adding in short sound effects (which may be intended to be presented in parallel or in series with spoken output from the TTS converter 32);

substitution tags for adding in pre-recorded passages that the message sender had previously spoken, sung, played or otherwise input.

In the present example, each tag takes the form of a two-letter code indicating tag type followed by a numeric parameter value, or values, and terminated by a "#" (this terminator only being required if the number of parameter values was variable for a given tag type). More particularly:

| TAG | Code | Parameter(s) |
|---|---|---|
| Voicing | dt - ("define talk") | First parameter - voice type - 0 to 9<br>Second parameter - voice mood - 0 to 9 |
| Background | tm - ("theme") | Item selection parameter - 0 to 9 |
| Effect | wa - ("wave") | Item selection parameter - 0 to 9 |
| Substitution | ps - ("personalization substitution") | Item selection parameter - 0 to 9 |

Thus the tag "dt23" specifies voice type number 2 in mood number 3 whilst tag "ps1" specifies pre-recorded personal sound passage number 1.

As regards voice type, as well as generic types such as young male, it is possible to include specific celebrity voices which would be available at a suitable charge.

In the present embodiment, for each tag type the user has control over the mapping between the tag parameter value(s) and the corresponding presentation-feature value(s)/item(s), this mapping being stored in a database 22 of the SM-SC 10 against the user's identity (alternatively, the mapping data can be stored with other user-profile data—for example, in the case of mobile users, the mapping data can be stored in the user's Home Location Register of the mobile network). The presentation-feature value is a code understood by the audio service node 15 as directly identifying the voice type/voice mood, background sound, sound effect, or pre-recorded passage to be included in the audio form of a message. Thus, for example, the user may have specified that the tag "tm1#" should map to Beethoven's Pastoral Symphony and in this case the user's mapping data will map "tm1#" to a code uniquely identifying that piece of music for inclusion as a background.

To permit the user to set the mappings of tag parameter values, the SM-SC 10 is provided with a user selection interface 24 which is accessible to the users. Interface 24 is, for example, a WAP or web-enabled interface accessible over the Internet. When accessed by a given user, the interface 24, which is connected to database 22, presents to the user their current mapping of parameter values to presentation feature values/items and permits them to edit their mapping (with reference to a list of available options held in choices memory 25) and, in the case of the user-recorded sound passages, to make or upload new recordings. The audio data corresponding to each available presentation feature value/item is not stored at the SM-SC 10 but in databases of the local audio services node 15; thus, voice pronunciation data (for example, digitized extracts of spoken language where the TTS converter 32 is a concatenative converter) are held in database 26 for each voice type and mood supported; user recordings are held in database 27, background sound passages are held in database 28, and effects sounds are held in database 29. In addition, further sound data for each presentation feature type can be held on remote resources available to the audio services node 15 across data network 39. In this connection, it is to be noted that the audio service node that is used to deliver the audio-form of a message may not be the audio service node local to the SM-SC but may, instead be one on a different network with a different holding of audio data—this is because it makes sense to minimize the use of the expensive bearer circuits by using the closest switch and audio services node to the target recipient. Accordingly, upon a message 11 being forwarded by the SM-SC 10 to switch 13, the SM-SC preferably associates with the message the address on data network 39 of its local audio service node where all required audio data can be found; if the audio service node used to deliver the audio form of the message is not the node local to the SM-SC 10, it can still retrieve the required audio data from the latter node. Since it may be expected that most messages 11 will be delivered using the audio services node local to the SM-SC 10, storing the audio data specifiable by the message sender at the local audio service node is likely to maximize overall efficiency.

Provision is also preferably made for enabling a user using interface 24 to be able to hear at least extracts of the available choices for the various different types of presentation sound features. This can be done, for example, by storing at SM-SC 10 local copies of the audio data or by providing an appropriate communications link with the local audio service node for retrieving the required audio data at the time it is requested by a user.

Figure 2:
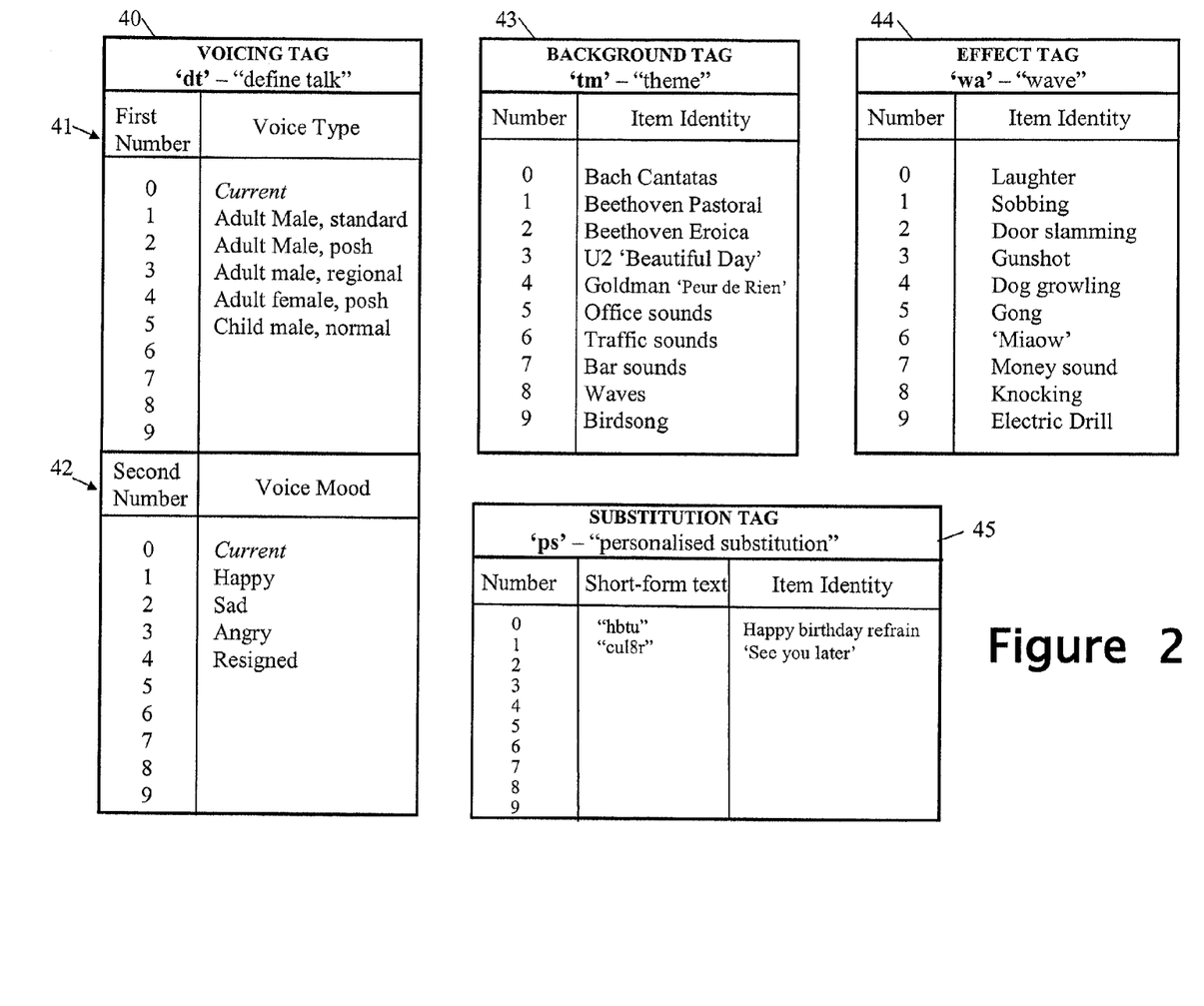
FIG. 2 shows user-specified mapping tables for mapping tag parameter values to presentation-feature values/items.

FIG. 2 depicts example mapping tables that are presented to a user via interface 24 and show, for each presentation feature type, the mapping of each assigned tag parameter value to presentation-feature value or item. Thus, table 40 shows that for the first parameter value 41 of the voicing tag (i.e. the voice type parameter), five specific voice types have been assigned to tag-parameter values 1–5, tag-parameter value "0" being a "no-change" value (that is, the current voice type is not to be changed from its existing setting). Similarly, four specific voice moods have been assigned to respective ones of the values 1–4 of the second voicing tag parameter 42, the parameter value "0" again being a "no change" value. The "0" values enable a user to change one voicing parameter without having to remember and specify the current value of the other voicing parameter. Tables 43 and 44 respectively relate to the background tag and the effect tag and each show all ten parameter values as being assigned. Table 45 relates to the substitution tag and is depicted as showing only two recordings assigned. It may be noted that for the substitution tag, the user can specify a short text string that can be used instead of the tag to trigger recognition, this text string typically having a linguistic relationship to the recording concerned and therefore being easy to remember. The user can also specify the descriptive text used as the identifier of the recording concerned.

It will be appreciated that other ways of enabling a user to specify mappings are possible including by interaction with a human agent or interactive voice response system over the telephone or by using SMS messages. The mappings can be stored in any suitable data structure and are not limited to tabular forms of mappings, any form of association data can be used to associate the tags and feature type values. With regard to the provision of recording data, in view of the low sound quality of telephone connections, where quality is important (for example, in situations where audio-form messages are deliverable over high-bandwidth channels) it is preferred that the user makes the required recording either over a high-bandwidth, low noise channel or makes the recording locally and then uploads it over a suitable data network. The user-recording data, however provided, is passed by the SM-SC 10 to the local audio services node.

Considering the operation of the FIG. 1 arrangement in more detail, a message arriving at the SM-SC 10 is temporarily stored by the SM-SC control subsystem 20 in message store 23. If the message header data of message 11 indicates that it is to be converted into audio form for delivery, the message is processed by message parser and coder 21 that scans the message for presentation-feature tags; for each tag encountered, the message parser and coder 21 looks up in the user-mapping-data database 22 the actual code value of the presentation feature to be represented in the audio form of the message. The code values corresponding to the message tags are substituted for the latter in the message as held in store 23. The message parser and coder 21 thus acts as an arrangement for interpreting the tags.

Next, the control subsystem 20 forwards the message to switch 13 which passes it to audio services node and tries to establish a voice circuit connection to the intended recipient. If a connection cannot be established, this is indicated back to the SM-SC control subsystem 21 which retains the message 11 in store 23 and schedules a delivery retry for later. If, however, the switch successfully establishes a call to the target recipient and the call is picked up, switch 13 triggers the audio service node 15 to play the message and informs the SM-SC control subsystem that the message has been delivered (this delivery notification can be delayed until part or all of the message has been delivered to the recipient). Upon receipt of the message delivery notification, control subsystem 20 deletes the message from store 23.

The audio service node 15 includes a signaling interface 30 for exchanging control messages with the switch 13 (the text-form messages being included in such control messages), and a bearer circuit interface 33 providing bearer circuit connectivity with switch 13. The node 15 further comprises a control subsystem 31, TTS converter 22 (already mentioned), user recording substitution block 35, background sound block 36 and effects sound block 37, the latter four elements all being connected to the control subsystem 31, to network interface 38 to enable them to retrieve data over data network 39 from remote audio data resources and to respond to requests for their own audio data, and to the bearer-circuit interface 33 for outputting audio signals for inclusion in the audio form of a message.

Upon the control subsystem 31 receiving a message to be converted from switch 13, it first checks whether the message is accompanied by the address of an audio service node holding the audio data to be used for the message—if no such node is specified or if the current node is the specified node, no action is taken as it is assumed that the required audio data is held locally; however, if a remote node is specified, the control subsystem determines the tag code values in the message for each tag type and instructs the corresponding blocks 32, 35, 36, 37 to retrieve and cache the required audio data from the remote node. Since this could take a significant time, the control subsystem can be arranged to signal switch 13 to defer call set up until such time as all the needed audio data is present.

In due course, with all required audio data present at the service node, switch 13 after having established a call to the target recipient, instructs the audio service node to initiate message delivery. Control subsystem 31 now proceeds through the message and orchestrates its translation into audio form by the blocks 32, 35, 36 and 37. In particular, the control subsystem 32 sets the operation of the TTS converter (or selects the TTS converter) according to the voice type and mood specified at the start of the message (or, if not specified, uses a default specification) and then passes non-tag-related text passages to the TTS converter. As the control subsystem proceeds through the message, it encounters various tag-related code values which it uses to control operation of the blocks 32, 35, 36 and 37 to change voicing parameters and to introduce specified sound effects, background themes, and user recordings as required.

As an alternative to the text-form messages being stored in database 23 of SM-SC 10 pending delivery of the audio-form message, where the target recipient has a voice mail box, the text message can be converted into audio form without delay and sent to the voice mail box of the recipient. However, this is not efficient in terms of storage space occupied by the message.

Since a recipient may have an answer phone, the audio service node is preferably arranged to delay a second or two following call pick-up before starting delivery of the audio message. During this initial period, listening circuitry at the audio service node determines whether an answer phone has been engaged and is playing a message (circuitry suitable for distinguishing a human pick-up response, such as "hello", from an answer phone message already been known in the art). If the listening circuitry determines that an answer phone has been engaged, then it will cause delivery of the audio-form message to be delayed until the answer phone has delivered its initial message and has indicated that it is in a record mode.

Where the recipient device can itself receive and store text messages, another alternative is to pass the text message (with the tag-derived feature code values) and the address of the node storing the required audio data, to the recipient device for storage at that device. The recipient user can then read the message in text form and decide whether they wish the message to be converted into audio form and played in all its richness. If the recipient chooses to do this, the recipient appropriately commands their device to send the text message (for example, via SM-SC) to the audio service node 15 for conversion into audio form and play back over a bearer channel established by switch 13. An advantage of proceeding in this manner is that the cost of establishing an audio channel (bearer circuit) is only incurred if specifically chosen by the message recipient. It would also be possible to pass the text message with the un-mapped tags direct to the recipient and in this case, returning the message to the infrastructure for conversion into audio form would require the message tags to be mapped by the SM-SC or audio service node using the tag mapping data, prior to conversion of the message into audio form. Of course, it would further be possible for the audio conversion to be done locally by the recipient though this is unlikely to be practical in most situations.

It may be noted that although it is preferred to give the user the ability to map tag parameter values to presentation-feature values/items, it is also possible for the mapping to be fixed by the operator of the SM-SC, or indeed, for no choice to possible (there only being one presentation-feature value/item per presentation-feature type).

Figure 3:
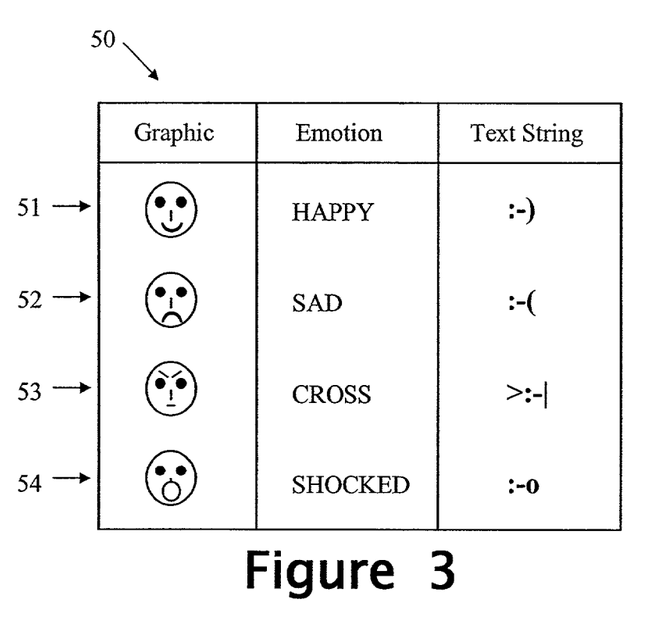
FIG. 3 is a table depicting some common "smilies"

Whilst the above-described arrangement provides an extremely flexible way of personalizing the audio-form presentation of text messages, it is quite "low-level" in terms of controlling specific features to produce particular effects. It is therefore envisaged that specification of higher-level presentation semantics is likely to be more user friendly; in particular, the ability simply to specify an emotion to be conveyed at a particular point in a message is likely to be considered a valuable sender-device feature. In this connection, the expression of emotion or mood in text messages is currently commonly done by the inclusion of so-called "smilies" in the form of text character combinations that depict facial expressions. FIG. 3 depicts four well known "smilies" representing happiness, sadness, irritation and shock (see rows 51 to 54 respectively of table 50), each smilie being shown both in its classic text-string form and in a related graphic form.

In order to accommodate the specification and expression of emotion, the system described above with respect to FIGS. 1 and 2, is arranged to recognize emotion tags and to map them to specific presentation feature values/items according to a mapping previously established by the sender.

Figure 4:
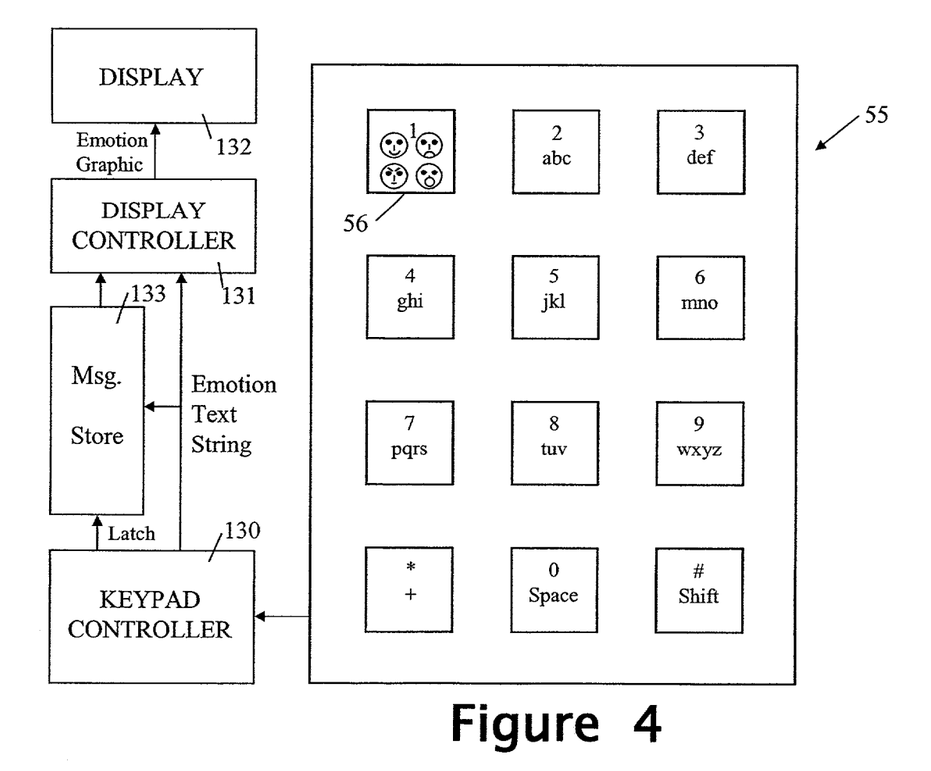
FIG. 4 illustrates a keypad with a key assigned to the insertion of emotion tags into text messages.

Furthermore, to facilitate the inclusion of emotion tags in a text message as it is constructed, the keypad of the device (such as a mobile phone) used by the message sender is adapted to have emotion tags specifically assigned to one of its keys. Thus, as shown in FIG. 4, the first key 56 of keypad 55 is assigned smilies that can be inserted into text messages, each smilie being represented in the text form of the message by its corresponding character string (see FIG. 3) and displayed on the sender-device display by the corresponding graphic. The smilie text string included in the text-form message constitutes the emotion tag for the emotion represented by the smilie concerned. The appropriate smilie is selected using key 56 by pressing the key an appropriate number of times to cycle through the available set of smilies (which may be more than the four represented in FIGS. 3 and 4); this manner of effecting selection between multiple characters/items assigned to the same key is well known in the art and involves keypad controller 130 detecting and interpreting key presses to output, from an associated memory, the appropriate character (or, in this case, character string) to display controller 131 which displays that output to display 132. Upon the keypad controller 130 determining that the user has finally selected a particular one of the smilies assigned to key 56, the corresponding character string is latched into message store 133. The display controller 131 is operative to recognize emotion character strings and display them as their corresponding graphics.

Where the sender device is not provided with a smilie key such as key 56, the smilie-based emotion tags can still be included by constructing the appropriate smilie text string from its component characters in standard manner. Of course, the text string used to represent each emotion tag need not be the corresponding smilie text string but the use of this string is advantageous as it enables the emotion concerned to be discerned by a recipient of the text-form of the message.

Figure 5:
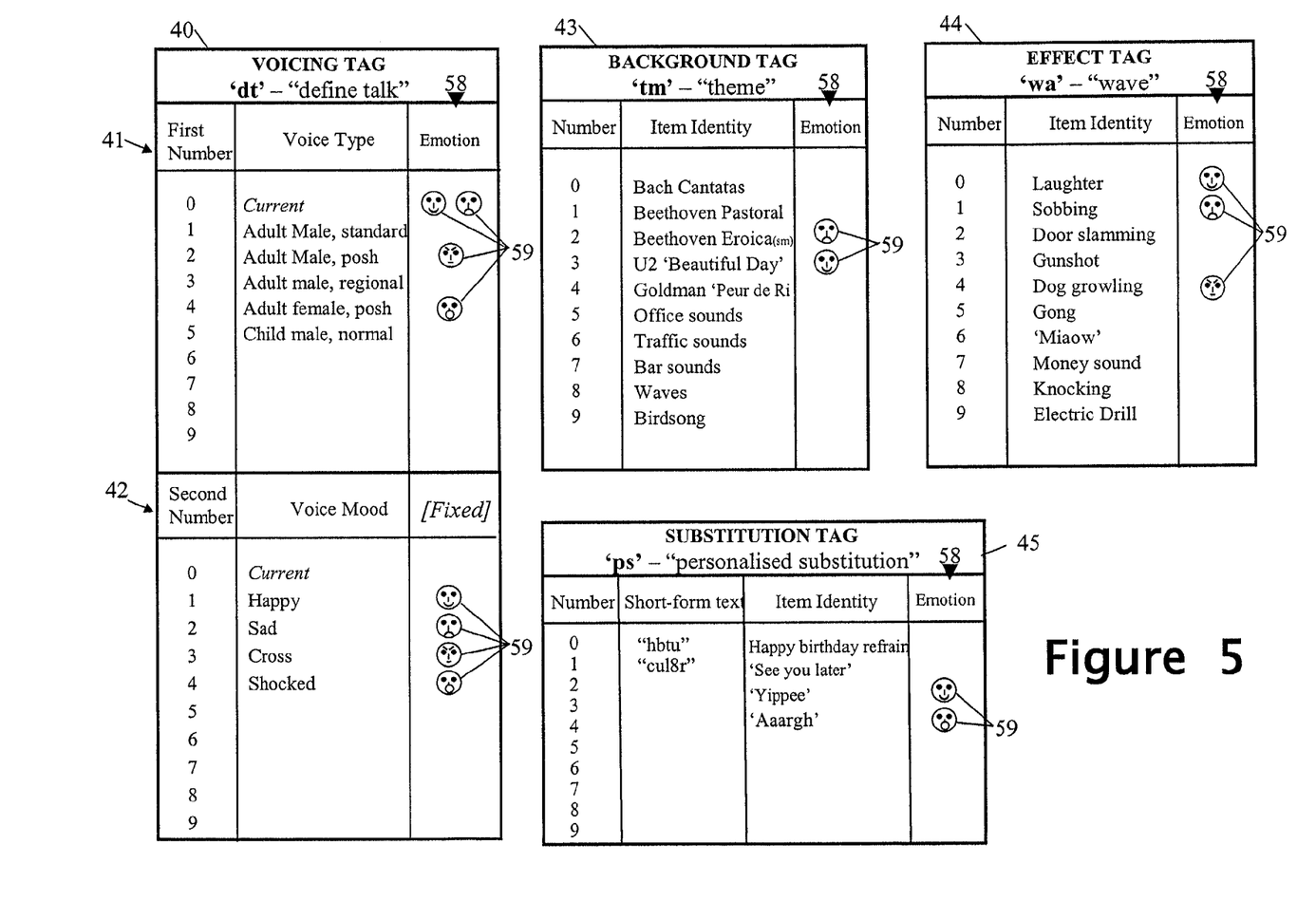
FIG. 5 shows the FIG. 2 table extended to include the mapping of emotion tags to presentation-feature values/items.

FIG. 5 shows the mapping tables 40, 43, 44 and 45 of FIG. 2 extended to include mapping between emotion tags (represented in FIG. 5 by the corresponding smilie graphics 59) and presentation feature values/items. In particular, for each type of presentation feature, the user is enabled, in any appropriate manner, to add in column 58 of the corresponding table, smilies that server to indicate by the row against which they are added, the presentation-feature value/item to be used to represent the emotion concerned when the corresponding emotion tag is encountered in a message 11. Thus, in respect of the "shock" emotion, the "shock" smilie has been added against voice type "adult female, posh" in voicing-tag table 40, pre-assigned to voice mood "shocked" in the same table, and added against a recording identified as "Aaargh" in the substitution-tag table 45; the "shock" smilie has not, however been assigned to any value/item of the other types of presentation feature. It may be noted that the smilies are pre-assigned to the voice moods so that the "shock" smilie automatically maps to the "shocked" voice mood. It may further be noted that the voice type can be kept unchanged when interpreting a smilie by assigning that smilie to the "current" value of the voice type parameter (indeed, this is a default assignment for smilies in the emotion column for the voice type parameter).

Returning to a consideration of the "shock" smilie example, as a result of the above-described assignment, upon the message parser and coder 21 of FIG. 1 encountering a "shock" emotion tag (the "shock" smilie text string) in a message 11, it will map it to presentation-feature value codes for a voice type of "adult-female, posh", voice mood of "shocked" and user pre-recorded sound of "Aaargh". In fact, rather than having the "shock" emotion tag (or, indeed, any other emotion tag) interpreted by multiple presentation feature types for the same occurrence of the tag, provision is made for the user to specify when adding the tag which form (or forms) of presentation feature—voice/background sound/effect sound/recording substitution—is (are) to be used to represent the current occurrence of the tag. This can be achieved by following each tag with a letter representing the or each presentation feature type followed by a terminating "#" character. Thus the presentation feature types can be represented by:

| | |
|---|---|
| Voice | - s |
| Background | - b |
| Effect | - e |
| Substitution | - r | so that shock to be presented by a user recording would be represented by the emotion tag:

:-or# whereas shock to be presented by both voice type and a user recording would be represented by the emotion tag:

:-ovr#

Thus, whilst the presentation-feature type(s) to be used to express a particular emotion tag instance is (are) defined at the time of tag insertion into a message, the actual value/item to be used for that presentation feature(s), is predefined in the corresponding table for the emotion concerned. Of course, a default presentation-feature type can be system or user-defined to deal with cases where a smilie text string is not followed by any qualifier letter and terminating "#".

As opposed to the above-described arrangement where the presentation feature type is specified at the time of message input but the feature value/item to be used is preset for each emotion, it is possible to envisage a number of other combinations for the presetting (by system operator or user) or dynamic specification of the feature type and value/item to be used to represent emotion tags. The following table sets out these possible combinations and indicates an assessment of their relative merits:

| | | PRESENTATION FEATURE TYPE | | |
|---|---|---|---|---|
| Mapping of emotion tags to presentation feature type and value | | System Set | Preset by Sender | Sender Msg. Input |
| FEATURE VALUE/ITEM | System Set | Inflexible | OK | Good |
| | Preset by Sender | OK | OK | Preferred |
| | Sender Msg. Input | ← | unduly detailed | → |

The implementation of any of the above combinations is within the competence of persons skilled in the art.

Figure 6:
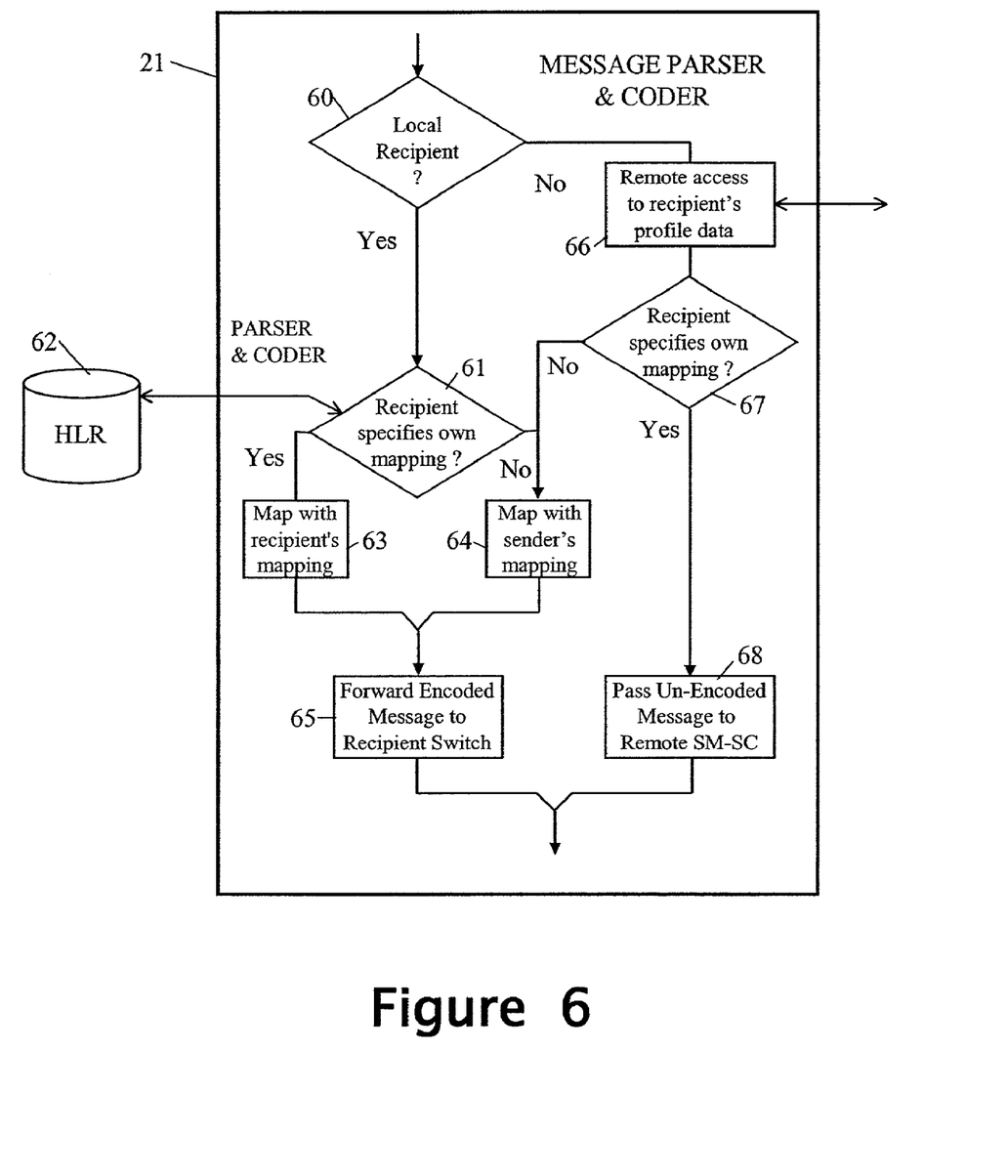
FIG. 6 is a diagram illustrating the operation of a message parser and coder block of the FIG. 1 short-message service center in checking for recipient tag mappings.

In all the foregoing examples, the mapping used to map text-form message tags to audio presentation features have been sender specified. In fact, it is also possible to arrange for the mapping used to be one associated with the intended recipient of the message. This can be achieved by having the recipient specify a mapping in much the same manner as already described for the message sender, the mapping being stored in a user-mapping-data database associated with the recipient (this may be the same or a different database to that holding the mapping data for the message sender). When the message parser and coder functional block 21 of the SM-SC 10 receives a tagged message, it is arranged to check for recipient mapping data and to use that data in preference to the sender mapping data ( or the sender's mapping data could be used for some types of presentation features and the recipient's mapping used for other types of presentation features). FIG. 6 illustrates the steps carried out by the message parser and coder block 21 in determining what mapping data to use for converting tags in a message 11 into presentation-feature code values. In this example, the mapping data associated with users of SM-SC 10 is held in HLR 62 rather than the database 22 depicted in FIG. 1. The block 21 first checks (step 60) whether the recipient is local (that is, whether their user profile data is held on HLR 62); if this is the case, block 61 checks HLR 62 to see if any mapping exists for the recipient (step 61); if recipient mapping data exists, the current message is mapped using that data (step 63); otherwise, the sender's mapping data is retrieved from HLR 62 and used to map the message tags (step 64). The encoded message is then forwarded to switch 65 and a copy retained in store 23.

If the check carried out in step 60 indicates that the recipient user-profile data is not held on HLR 62, block 21 remotely accesses the HLR (or other user-profile data repository) holding the recipient's profile data (step 66). If the recipient profile data does not contain mapping data, then the sender's mapping data is retrieved from local HLR 62 and used as previously (step 64). However, if recipient mapping data does exist, then the block 21 passes responsibility for mapping the message to the SM-SC associated with the recipient (it being assumed here that such SM-SC exists and its address is retrievable along with the recipient mapping data the recipient); this strategy is justified not only because it avoids having to transfer the recipient's mapping data to the sender's SM-SC, but also because the audio service node likely to be used in converting the message into its audio form is the one local to the recipient's SM-SC, this node also being the one where the audio data referenced by the recipient's mapping data is held.

As with the sender's mapping data, the recipient's mapping data can be set up to map presentation-feature tags and/or emotion tags to presentation-feature values/items for one or more types of presentation feature.

Figure 7:
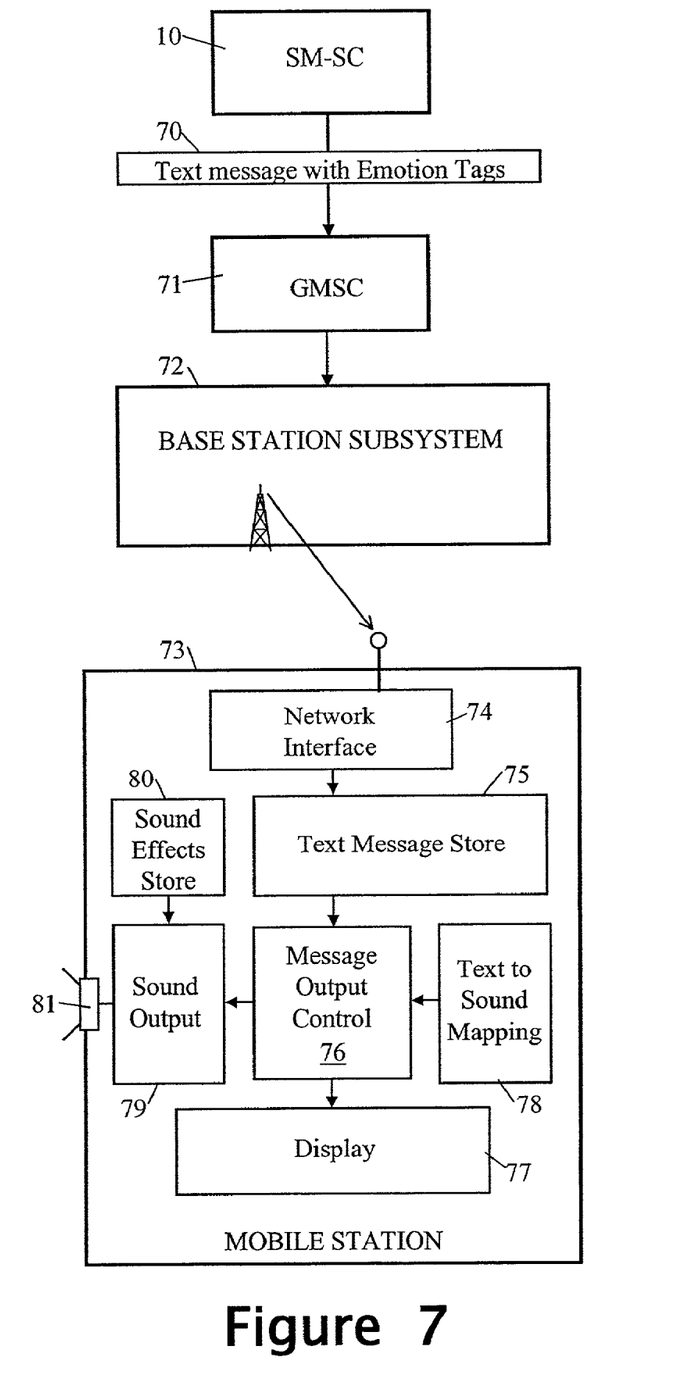
FIG. 7 is a diagram illustrating the passing of a text message with embedded emotion tags to a mobile station where the emotion tags are converted to sound effects.

FIG. 7 depicts a variant arrangement for the recipient-controlled mapping of tags (in particular, emotion tags) into audio presentation feature items. In the FIG. 7 scenario, a text-form mobile-terminating message 70 with embedded emotion tags is forwarded by SM-SC 10 to mobile station 73 via gateway mobile switching center (GMSC) 71 and base station subsystem 72. The mobile station 73 comprises an interface 74 to the mobile network, a message store for receiving and storing text messages, such as message 70, from the network interface 74, a message output control block 76, and a display 77 for displaying the text content of the received text messages under the control of message output control block 76. The mobile station further comprises memory 78 holding text-to-sound mapping data, a sound effects store 80 holding audio data for generating sound effects, and a sound output block 79 for using audio data retrieved from store 80 to generate audio output via loudspeaker 81.

The mapping data held in memory 78 maps text strings, and in particular the text strings representing emotion tags, to sound effects held in store 80, this mapping being initially a pre-installed default mapping but being modifiable by the user of the mobile station 73 via the user interface of the mobile station.

Upon the message output control block 76 being commanded by user input to output a message held in store 75, the control block 76 progressively displays the message text as dictated by the size of the display (generally small) and scroll requests input by the user; however, control block 76 removes from the text to be displayed those text strings that are subject of the mapping data held in store 78—that is, the text strings that constitute sound feature tags. When control block 76 encounters such a tag, it commands the sound output unit 79 to generate the sound effect which, according to the mapping data, corresponds to the encountered tag.

Proper coordination of sound effect output with the message display is important in order to ensure that the sound effects are produced as nearly possible at the moment that the recipient is reading the related text. In this respect it may be noted that even though the message tags are reliable indicators of the points in the message of where sound effects should be produced, the very fact that the display can display one or more lines of the message text at any given time means that there is substantial uncertainty as to when to produce a tag-indicated sound effect—is this to be done immediately the text surrounding the tag position is displayed or at some subsequent time ? In the present embodiment, the following policy is implemented by the control block 76 in determining when to command sound output block to generate a sound effect corresponding to a detected tag:

for a tag appearing in the first few characters of a message (for example, in the first twelve displayed characters), the corresponding sound effect is produced immediately the first part of the message is displayed;

for a tag appearing between the first few characters and two thirds of the way through the part of the message first displayed (for example, for a three line display, the end of the second line), the corresponding sound effect is produced after a time delay equal to the time to read to the tag position at a normal reading speed plus a two second delay intended to compensate for a settling time for starting to read the message after its initial display;

thereafter, apart from the terminating portion of the message (for which portion, see below), as text is scrolled through a middle portion of the display (for example, the middle line of a three line display, or the mid-position of a single line display) the sound effects for tags in the middle portion of the display are produced (in sequence where more than one tag is scrolled into this middle portion at the same time as would be the case for a three line display where scrolling is by line shift up or down, the spacing in time of the sound effects being governed by a normal reading speed);

for the terminating portion of the text (that is, the portion that need not be scrolled through the middle portion of the display in order to be read), any tags that are present have their corresponding sound effects generated in sequence following on from the tags of the preceding part of text, the spacing in time of multiple sound effects in this terminating portion being governed by a normal reading speed.

An alternative approach is to use the position of a cursor to determine when a sound effect is to be produced—as the cursor moves over the position of a tag in the displayed text, the corresponding sound effect is produced. Preferably, the cursor is arranged to advance automatically at a user-settable speed with scrolling being appropriately coordinated.

Rather than completely removing all trace of a message tag from the displayed text, the tag can be indicated by a character or character combination such as: * !# or else the tag can be displayed in its native text string form (this being most appropriate for emotion tags that are in the form of text-string smilies).

The mapping of text strings to sound effects need not be restricted to text strings that correspond to recognized tags but can be used to set suitable sound effects against any text string the recipient wishes to decorate with a sound effect. Thus, for example, the names of friends can be allocated suitable sound effects by way of amusement.

Figure 8:
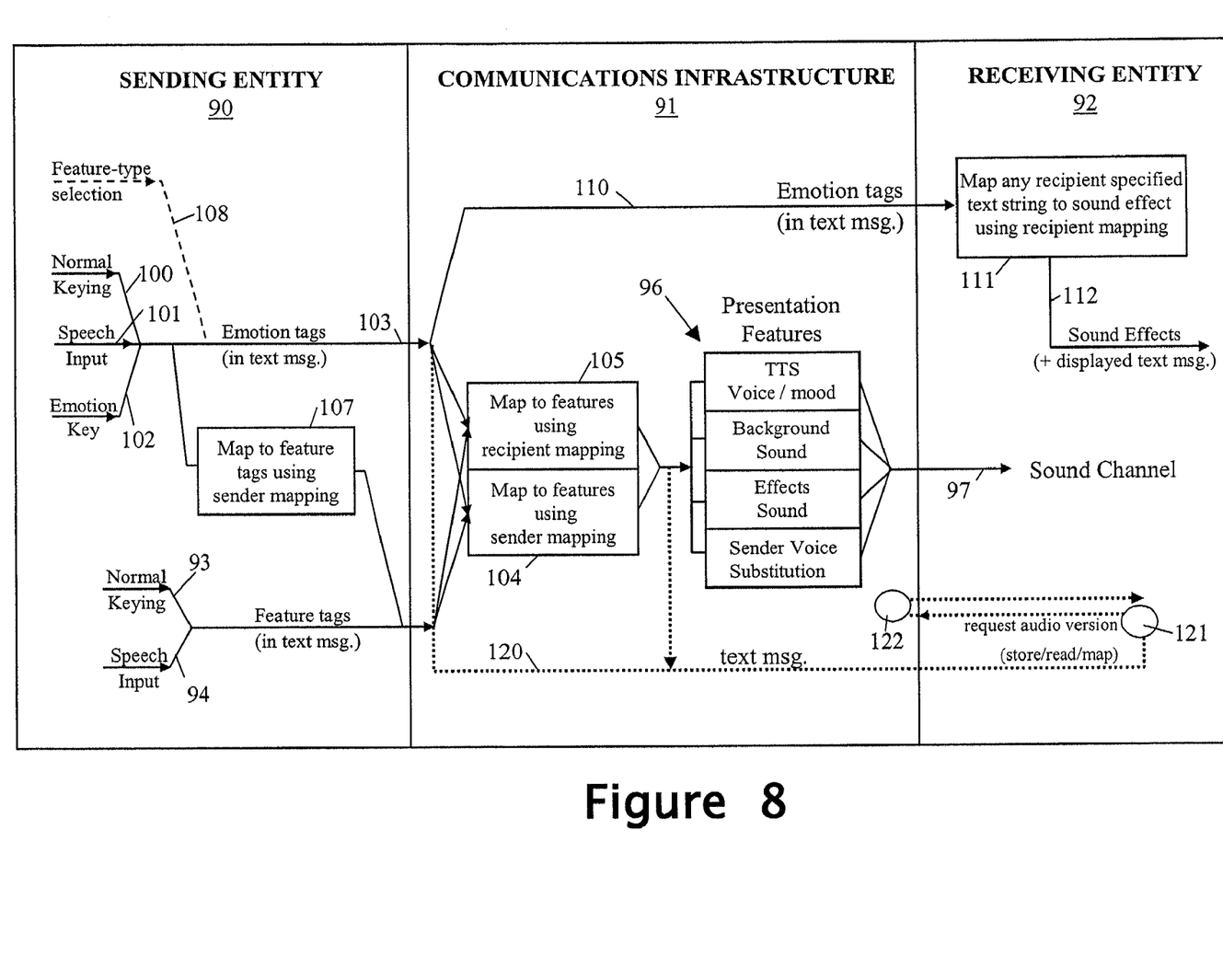
FIG. 8 is a diagram summarizing the feature combinations for tag insertion, mapping and presentation.

FIG. 8 is a diagram showing the inter-relationship of the various system and device capabilities described above and also serves to illustrate other possible features and combinations not explicitly mentioned. More specifically, FIG. 8 depicts a sending entity 90, a communications infrastructure 91, and a receiving entity 92, each of which maybe of any form suitable for handling text messages and are not limited to cellular radio elements (for example, the sending entity could be a device capable of creating and sending e-mails, whilst the receiving entity could one intended to receive SMS messages, it being known to provide an infrastructure service for converting e-mails to SMS messages).

The generation of text messages directly containing presentation-feature tags is represented by arrows 93 (for keypad input of characters) and 94 (for input via a speech recognizer); other forms of input are, of course, possible (including combinations, such as a combination of key presses and automatic speech recognition). The feature tags are mapped to code values for presentation-feature values/items by a sender-specified mapping 104 or a recipient-specified mapping 105. The resultant encoded message is passed to an audio conversion subsystem 96 where the presentation-feature code values are used to set values/items for voice type, voice mood, background sound, effect sounds, and pre-recorded-sound substitution, the resultant audio-form message being output via a sound-signal channel 97 to the receiving entity 92.

The generation of text messages containing emotion tags is represented by arrow 100 (for keypad input of characters), arrow 101 (for input via a speech recognizer), and arrow 102 for input using an emotion key such as key 56 of FIG. 4. The emotion tags are mapped to code values for presentation-feature values/items by a sender-specified mapping or a recipient-specified mapping (here shown as part of the mappings 104 and 105, though separate mappings could be used). The encoded message generated by the mapping process is then passed to the audio conversion subsystem as already described.

Block 107 depicts the possibility of emotion tags being mapped to feature tags in the sending entity 90, using a mapping stored in that entity (for example, after having been specified by the user at the sending entity).

Dashed arrow 108 represents the inclusion of feature-type selection code letters with the emotion tags to indicate which presentation-feature type or types are to be used to present each emotion tag.

Dotted arrow 120 depicts the transfer of a text-form message (either with plain tags embedded or, preferably, after mapping of the tags to feature code values) to the receiving entity 92 where it is stored 121 (and possibly read) before being sent back to the communications infrastructure 91 for tag mapping, if not already done, and message conversion to audio form, jointly represented in FIG. 8 by ellipse 122. As a variant, if the received text message includes plain tags, then the mapping to feature code values could be done at the receiving entity.

Arrow 110 depicts the passing of a tagged message (here a message with emotion tags) to the receiving entity 92 where the tags are mapped to sound effects using a recipient-specified mapping (see block 111), the message text being visually displayed accompanied by the synchronized generation of the sound effects (arrow 112).

It will be appreciated that many other variants are possible to the above described arrangements. For example, a voicing tag can be set up to map to a TTS converter that is not part of audio service node 15 but which is accessible from it over network 39. In this case, the address (or other contact data) for the TTS converter is associated with the encoded message that is passed on from the SM-SC 10 to the audio service node 15; appropriate control functionality at this node is then used to remotely access the remote TTS converter to effect the required text-to-speech conversion (the connection with the TTS converter need not have a bandwidth adequate to provide real-time streaming of the audio-form speech output signal from the remote TTS converter as the audio-form signal can be accumulated and stored at the audio service node for subsequent use in generating the audio-form message for delivery once all the speech data has been assembled).

Another possible variant concerns the emotion key 56 of the FIG. 4 keypad. Rather than selection of the desired emotion being effected by an appropriate number of consecutive presses of the emotion key, an initial press can be used to indicate that the next key (or keys) pressed are to be interpreted as selecting a corresponding emotion (thus, happiness could correspond to key associated with the number "2" and sadness with the key numbered "3"); in this case, the emotion key effectively sets an emotion selection mode that is recognized by the keypad controller 130 which then interprets the next key(s) pressed as a corresponding emotion. To facilitate this operation, when the emotion key is initially pressed, this can be signaled by the keypad controller 130 to the display controller 131 which thereupon causes the output on display 132 of the mapping between the keypad keys and emotions (this can simply done by displaying smilie graphics in the pattern of the keypad keys, each smilie being located in the position of the key that represents the corresponding smilie). In fact, the display can similarly be used for the embodiment where emotion selection is done by an appropriate number of presses of the emotion key; in this case the display would show for each emotion how many key presses were required.

Furthermore, the display controller is preferably operative, when displaying a text message under construction, to indicate the presence of included emotion indicators and their respective spans of application to the display message text (it being understood that, generally, an inserted emotion tag is treated as having effect until superseded or cancelled, for example, by a full stop). For example, with a colour display, the emotion associated with a particular section of text can be indicated by either the font colour or background colour; alternatively for both colour and grey scale displays, the beginning and end of a text passage to which an emotion applies can be marked with the corresponding smilie and an arrow pointing into that text section.

It may be noted that as employed in the embodiment of FIGS. 4 and 5, the emotion tag is, in effect, serving as an audio style tag indicating by its value which of a number of possible sets of presentation feature values is to be applied.

The use of an audio style tag need not be limited to the setting of audio presentation feature values for representing emotions but can be more widely used to enable the sender to control audio presentation of a text message, the mapping of the style tag to presentation feature values being carried out in any of the ways described above for mapping emotion tags to presentation feature values. In this connection, the sender can, for example, set up a number of styles in their local text message device, specifying the mapping of each style to a corresponding set of presentation features, as mentioned above for emotion tags (see mapping 107 of FIG. 8); provision can also be made for the sender to specify character strings whose input is to be recognized as a style indication by the keypad controller (in the case that a key is not specified as a style key in a manner to the emotion key 56 of FIG. 4).

With respect to the presentation-feature-type indication described above as being inserted after an emotion tag to select the feature type to be used to express the indicated emotion (arrow 108 of FIG. 8), it is possible to vary how such an indication is utilized. For example, rather than requiring each emotion tag to have an associated feature-type indication(s), a feature-type indication can be arranged to have effect until superceded by a different indication (in this case, it would only be possible to use one feature type at a time) or until cancelled by use of an appropriate code (this would enable multiple feature types to be concurrently active); in either case, a sender could insert the indication of a selected feature type at the start of a message and then need not include any further feature-type indication provided that the same feature type was to be used to express all indicated emotions in the message. It will be appreciated that the presentation-feature-type indications will generally be interpreted at the same time as the emotion tags, the indications being used to narrow the mapping from an indicated emotion to the presentation feature type(s) represented by the indications. This interpretation and mapping, and the subsequent conversion of the message to audio form, can be effected in the communications infrastructure as described above, or in a recipient device.

It will also be appreciated that the messaging system involved is not limited to SMS messaging and can, for example, be any e-mail or instant messaging system or a system which already has a multi-media capability.

The invention claimed is:

1. A communications method comprising the steps of:
   (a) providing association data indicating for each of multiple types of presentation feature by which emotions can be expressed in audio form, a respective value of the feature concerned that is to be used to express each of plural emotions;
   (b) generating a text message at a sending device, the generated text message having user-set embedded emotion indicators and feature-type indications,
   (c) converting the text message into audio form for delivery to a target recipient, emotions indicated by the embedded emotion indicators being expressed in said audio form using presentation feature types indicated by the embedded feature-type indicators with the values used for these presentation features being determined by said association data.

2. A method according to claim 1, wherein at least one said feature-type indication is associated with each emotion indicator included in the message.

3. A method according to claim 1, wherein each feature-type indication in a message has effect until superseded by the occurrence of a next type indication in the message.

4. A method according to claim 1, wherein each feature-type indication in a message has effect until cancelled.

5. A method according to claim 1, wherein said multiple feature types comprise at least two of:
   voice type;
   background theme;
   effects sound;
   user recording.

6. A method according to claim 1, wherein the sending device and recipient communicate across a communications infrastructure, at least part of step (c) being effected in the communications infrastructure.

7. A method according to claim 1, wherein at least part of step (c) is effected in a device associated with the message recipient.

8. A method according to claim 1, wherein in step (c) the determination of the feature type and value to be used to express the emotion indicated by each emotion indicator, is effected at one of the sender device, an element of a communications infrastructure communicating the sender device and recipient, and a device associated with the recipient.

9. A method according to claim 1, wherein the association data is previously provided by the message sender.

10. A method according to claim 1, wherein the association data is previously provided by the target recipient.

11. A method according to claim 1, wherein the emotion indicators take the form of character strings forming pictorial representations of corresponding emotions.

12. A method according to claim 1, wherein the type indicators take the form of characters inserted immediately after emotion indicators.

13. A communications method in which a text message generated at a sending device is converted into audio form by a message-conversion system for delivery to a target recipient, this conversion being effected in a manner enabling emotions, encoded by indicators embedded in the text message, to be expressed through multiple types of presentation feature in the audio form of the message, the mapping of emotions to feature values being pre-established for each feature type whilst the sender selection of one or more feature types to be used to express encoded emotions being specified under user control by type indications in the message.

14. A system for converting a text message into audio form, the text message having embedded emotion indicators and feature-type indications the latter of which serve to determine which of multiple audio-form presentation feature types are to be used to express, in the audio form of the text message, the emotions indicated by said emotion indicators; the system comprising:
   a data store holding association data indicating for each of multiple types of presentation feature by which emotions can be expressed in audio form, a respective value of the feature concerned that is to be used to express each of plural emotions;
   an interpretation arrangement responsive to the succession of emotion indicators and feature-type indications embedded in the text message to determine for each emotion indicator what type of presentation feature is to be used to express the indicated emotion and, by reference to said association data, what value of that presentation feature is to be used;
   an audio-output generation subsystem comprising
      a text-to-speech converter, and
      a presentation-feature generation arrangement operative, under the control of the interpretation arrangement, to provide audio-form presentation features in accordance with the succession of emotion indicators and feature-type indications embedded in the text message.

15. A system according to claim 14, wherein the interpretation arrangement is operative to continue to give effect to each type indication embedded in the text message until superseded by the occurrence of a next type indication in the message.

16. A system according to claim 14, wherein the interpretation arrangement is operative to continue to give effect to each type indication embedded in the text message until cancelled.

17. A system according to claim 14, wherein said multiple feature types comprise at least two of:
 voice type;
 background theme;
 effects sound;
 user recording, the presentation-feature generation arrangement being adapted to produce audio-form outputs of these types.

18. A system according to claim 14, wherein at least the presentation-feature generation arrangement is situated in a communications infrastructure used to communicate a text-message sending device with an audio-form message receiving device.

19. A system according to claim 14, wherein at least the presentation-feature generation arrangement is situated in an audio-form message receiving device.

20. A system according to claim 14, wherein the interpretation arrangement is located at one of a text-message sending device, an element of a communications infrastructure communicating the sending device and an audio-form message receiving device, and an audio-form message receiving device.

21. A system according to claim 14, wherein the data store has an associated user interface for enabling users to remotely specify said association data.

22. A system according to claim 21, wherein the association data is data previously specified by the sender of the text message.

23. A system according to claim 21, wherein the association data is data previously specified by an intended recipient of the text message.

24. A device for generating a text message, the device including a display and a user-controlled input interface associated with the display, the user-controlled input interface enabling the user to embed in the text message both emotion indicators indicative of emotions to be expressed, and feature-type indications which serve to determine which of multiple audio-form presentation feature types are to be used to express, in an audio form of the text message, the emotions indicated by said emotion indicators.

* * * * *